Nov. 29, 1938.      R. J. CHEESMAN      2,138,024
ALTITUDE MAP
Filed Aug. 23, 1935

RAYMOND J. CHEESMAN —— INVENTOR

BY *J. F. Mothershead*

ATTORNEY

Patented Nov. 29, 1938

2,138,024

UNITED STATES PATENT OFFICE 2,138,024

ALTITUDE MAP

Raymond J. Cheesman, Morgantown, W. Va.

Application August 23, 1935, Serial No. 37,454

3 Claims. (Cl. 35—41)

(Granted under the act of March 3, 1883, as amended April 30, 1928; 370 O. G. 757)

The invention described herein may be manufactured and used by or for the Government of the United States for governmental purposes without the payment to me of any royalty thereon.

This invention relates to maps and more particularly to flat-surfaced topographic, or altitude, maps.

An object of the invention is the simple creation of a flat-surfaced map comparatively depicting various altitudes of predetermined intervals of a mapped terrain.

Another object is the creation of appearance of height or altitude on a flat-surfaced map. By such an appearance a topographic map is infinitely easier to read.

Another object is the production of a model map for photographic reproductions.

Other objects, purposes and functions of my invention will be set forth in the following description, it being understood that the above general statement of the objects of my invention are intended to generally explain the same without limiting it in any manner.

A map is essentially a diagram. Its chief value lies in its reduction in scale of a large area, the entire scope of which would not otherwise come at once within human vision.

Maps generally show only two dimensions; length and breadth, or longitude and latitude. However, it has heretofore been known to indicate or depict varying and various altitude areas on a map by contour lines.

When a map has been formed in accordance with my invention, it may be photographically reproduced as often as desired and thereby eliminate the necessity of manufacturing duplicates. In constructing maps of this type for the purpose of photographic reproduction, care should be exercised in selecting toned materials described hereinafter which will photographically reproduce substantially the same tone values.

In the use of transparent toned material, a previously printed map may be used to eliminate the necessity of reprinting road routes, airplane courses, cities, States, counties, rivers, lakes, etc. However, it may be desirable to reprint such data after the toned material is applied. Again, it may be desirable to eliminate printing upon the constructed map in order to reproduce blank photographic maps to which may be applied any desired printed data, i. e., one may be printed as a road map while an identical photograph may be printed as a flying course map.

According to that by which I have illustrated the invention and by which it may be practiced—

By the use of the words "tone" or "toned material" herein and in the appended claims, it is to be understood that a uniform or gradate coloring, shading, hatching, dotting, checking, lining or the like is intended.

Figure 1:
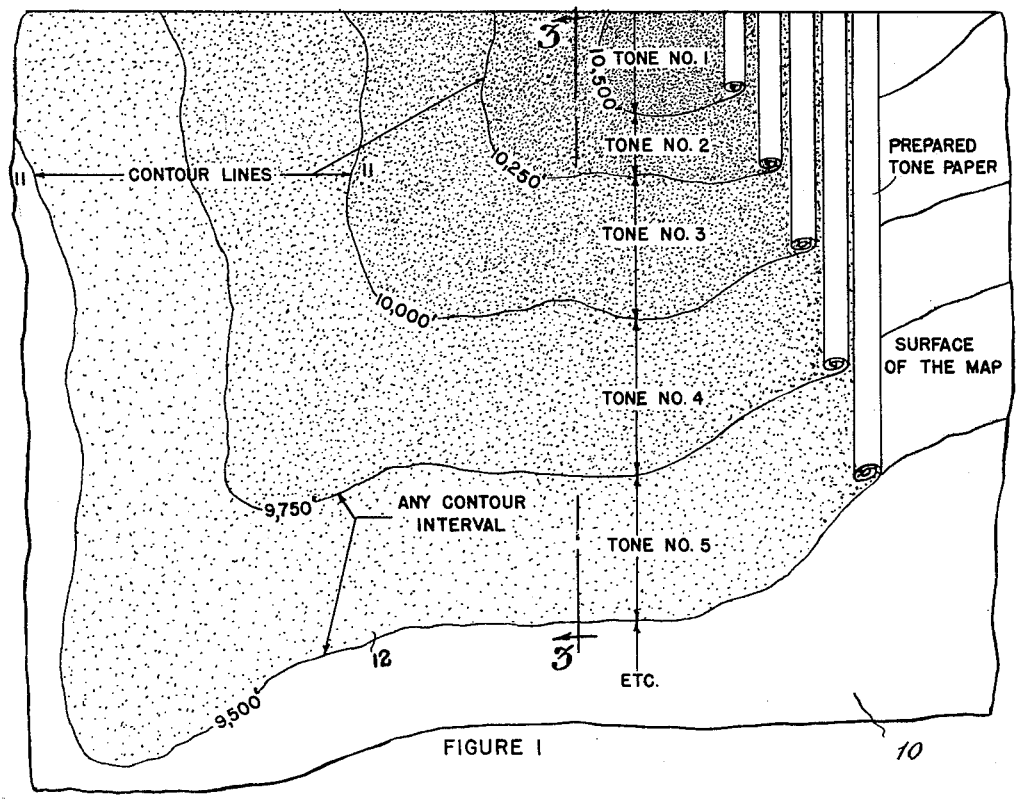
Fig. 1 illustrates, diagrammatically, a portion of the map to which patterned toned material is applied.
Figure 2:
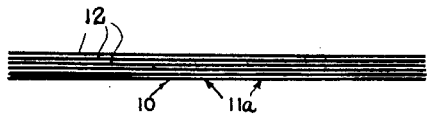
Fig. 2 illustrates a cross-section of a map and overlapping toned material thereupon prior to the cutting thereof along given contour lines.

In the construction of the map, toned paper or other material is patterned after the contour intervals desired to be shown on the map. Fig. 1 diagrammatically illustrates five contour intervals upon a map surface 10. Each plane, shown by way of example, represents a contour plane within a 250-foot height interval. A toned material 12 is patterned to fit each of the contour border lines 11. After the toned material 12 is once patterned, it is affixed upon the surface 10 of the map in juxtaposition with the contour lines 11.

It may be preferable to utilize toned material which progressively increases in value or tone for each succeeding, and altitude increasing contour interval. In other words it has also been found desirable to arrange the material so that the increase in the tone applied to one interval over that of the tone of the adjoining interval is substantially the same as the increase in tone between any other two adjacent strips. By this method similar increases in altitude ranges will be immediately indicated by similar increases in tone value. Or, it may be desirable to assign certain tones to certain altitudes so that the whole process becomes standard.

In the patterning of the toned materials for the different contour intervals, a number of methods may be employed. The contour line of each plane may be traced upon the toned material and the lines traced through the material. When the lines are once drawn the material may be cut and applied to the map in the most expeditious manner. The material selected may be of such a character as to readily adhere to the map surface.

Figure 3:
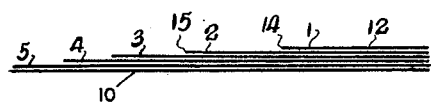
Fig. 3 is similar to Fig. 2 except that it illustrates the edges of stepped toned material, upon the map, after the successive sheets have been cut along the successive contour lines.

If transparent material is employed, it may be placed on the map and cut, with a blade or the like, along the contour lines without tracing. Again, the toned materials may be patterned as shown in Fig. 1 by overlapping or superimposing the materials as indicated by 12 and cutting through the various pieces of the material, along the contour lines 11 of Fig. 1 and as indicated in Fig. 3. By the latter method, more exact and identical contour shapes may be assured for the patterned pieces.

Fig. 3, as stated, illustrates a cross-section of the map after the overlapping materials have been cut, in the above manner, and references 1 through 5 represent the projecting edges of the patterned pieces corresponding with tones 1 through 5 in Fig. 1. Reference 11a indicates where the contour lines are with respect to the edges 14 and 15, etc., of the material.

The map is therefore formed by superimposing sheets of material of the same tone or value, or of uniformly different tones if desired, upon the map and cutting away only so much of the successive sheets of the material as will indicate the next step in the altitude. For example, if a map such as shown in Fig. 1, has five contour planes, the portion indicated by "Tone No. 1" will have, by this method, five superimposed materials, while that indicated by "Tone No. 2" will have four, etc. The superimposing of transparent materials will increase the tone as the number of sheets superimposed increases. This will be true whether the superimposed materials are of the same or different tone value.

The tone or shade of the paper to be applied depends upon the number of black dots in a given area. For instance, a tone having 100 black dots per square inch would be relatively light, while one containing 500 dots per square inch would be much darker. The black and white toning is most suitable for photographic reproductions.

Having described my invention, what I claim is:

1. A map depicting the various third dimensions of a mapped area comprised of a flat surface piece, transparent sheets of toned material, said sheets being patterned after the contour of the different altitude contour planes of the mapped area and applied to said surface piece, said patterned and applied material progressively having greater tone value for each altitude contour plane of progressively greater altitude.

2. A map depicting third dimensions of a mapped area comprising a flat surface piece, sheets of material having transparent and opaque areas to produce a tone, successive sheets being patterned after successive contours of different altitude contour planes of the map and applied to said surface piece in the same order, said patterned material varying in tone value for each contour plane of different altitude.

3. A map depicting third dimensions of a mapped area comprising a surface piece, sheets of material of uniform average toned transparency, said sheets being patterned after the contour of different altitude contour planes of the map and superimposed on said surface piece in the order of said planes whereby to effect a variance of tone value in each contour plane of different altitude.

RAYMOND J. CHEESMAN.